United States Patent [19]

Naruoka et al.

[11] Patent Number: 4,687,348
[45] Date of Patent: Aug. 18, 1987

[54] DEVICE FOR LOCKING/UNLOCKING ROTATION OF AN ECCENTRIC BEARING USED IN A COMPRESSION RATIO CHANGING MECHANISM OF AN INTERNAL COMBUSTION ENGINE

[75] Inventors: Takao Naruoka, Mishima; Yoshihito Moriya, Takahama; Touru Ichimiya, Mishima, all of Japan

[73] Assignee: Toyota Jidosha Kabushiki Kaisha, Toyota, Japan

[21] Appl. No.: 876,168

[22] Filed: Jun. 19, 1986

[30] Foreign Application Priority Data

Jun. 20, 1985 [JP] Japan .................................. 60-132989

[51] Int. Cl.$^4$ ...................... F16C 23/02; F02D 13/02
[52] U.S. Cl. .................................. 384/255; 123/48 B; 123/78 BA
[58] Field of Search ............... 384/129, 276, 247, 252, 384/255; 123/48 B, 78 BA

[56] References Cited
FOREIGN PATENT DOCUMENTS
48305 5/1983 Japan .................................. 123/48 B Primary Examiner—Stuart S. Levy
Assistant Examiner—David Werner
Attorney, Agent, or Firm—Cushman, Darby & Cushman

[57] ABSTRACT

A device for locking/unlocking rotation of an eccentric bearing interposed between a piston-pin and a connecting rod of an internal combustion engine for changing the compression ratio of the engine. The eccentric bearing has two lock holes, two guide grooves extending circumferentially from the lock holes and two colliding surfaces. The connecting rod has at least one lock-pin hole and a lock-pin is slidably inserted in the lock-pin hole. When the lock-pin is driven toward the eccentric bearing, the lock-pin can move toward the eccentric bearing and can engage the lock hole, thereby locking the rotation of the eccentric bearing. Since the colliding surfaces are provided opposed to said guide grooves, the lock-pin can reliably engage one of the lock holes without jumping the lock hole whether the eccentric bearing rotates in a normal direction or in a reverse direction. As a result, a reliable changing between a high compression ratio and a low compression ratio can be obtained.

22 Claims, 33 Drawing Figures

FIG.22
FIG.23
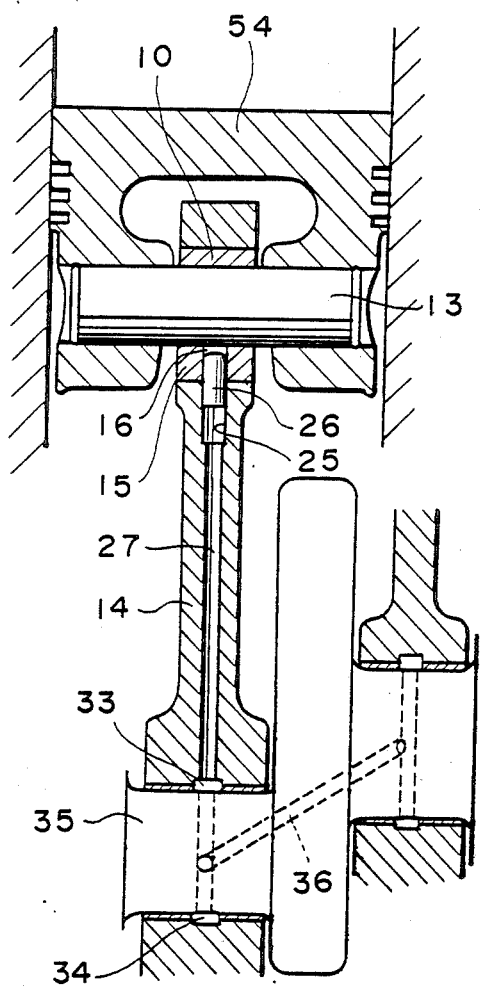
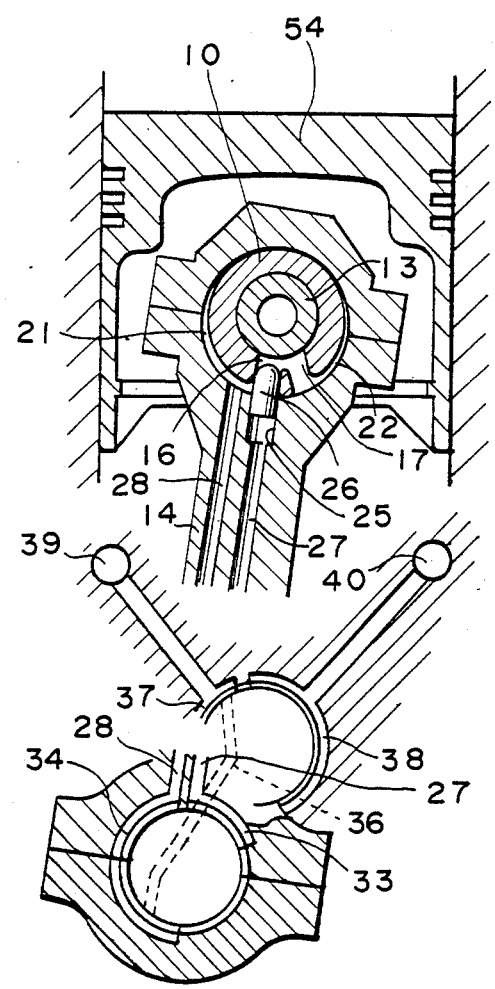

DEVICE FOR LOCKING/UNLOCKING ROTATION OF AN ECCENTRIC BEARING USED IN A COMPRESSION RATIO CHANGING MECHANISM OF AN INTERNAL COMBUSTION ENGINE

BACKGROUND OF THE INVENTION

1. Field of the Invention:

The present invention relates to a device for locking/unlocking rotation of an eccentric bearing interposed between a piston-pin and a connecting rod of an internal combustion engine to change a compression ratio of the engine according to the rotation of the eccentric bearing.

2. Description of the Prior Art:

In an Otto-cycle internal combustion engine it is desirable to increase the compression ratio, because an increased compression ratio brings about an improved fuel efficiency as well as an increased axial torque. However, the increase of the compression ratio will be limited, because increase in the compression ratio is accompanied with an increased probability of causing knocking in the engine when the gas in the combustion chamber is adiabatically compressed and the temperature of the gas rises. The knocking is liable to occur under high engine loads when an amount of air introduced into the combustion chamber is large and is less liable to occur under low engine loads when an amount of air introduced into the combustion chamber is small. Therefore, it is desirable to make the compression ratio changeable according to engine loads so that the compression ratio may be high under medium and low engine loads and may be low under high engine loads.

To satisfy these requirements various proposals have been made concerning compression ratio changing devices for an internal combustion engine. Japanese Utility Model Publication SHO No. 58-137832 discloses the eccentric bearing-type device in which the eccentric bearing having a cylindrical inside surface eccentric with respect to a cylindrical outside surface is installed between the piston-pin and the connecting rod. When the connecting rod rotates, the relative position of the piston with respect to the connecting rod is changed and the compression ratio of the engine is varied.

To explain the problems in the conventional eccentric bearing-type device, the structure of the conventional device will be explained while referring to FIGS. 26 to 31. Eccentric bearing 1 having inside surface 2 and outside surface 3 is rotatably interposed between the piston-pin and the surface of the small end hole of connecting rod 5. Lock hole 4 is formed in eccentric bearing 1 and lock-pin hole 6 is formed in connecting rod 5. The centers of lock hole 4 and lock-pin hole 6 are included in a common plane which is at a right angle with respect to the axis of eccentric bearing 1. Lock-pin 7 is slidably inserted into lock-pin hole 6 to be able to move into lock hole 4. When lock-pin 7 in lock-pin hole 6 moves toward lock hole 4 and one portion of lock-pin 7 comes into engagement with lock hole 4, the rotation of eccentric bearing 1 is locked and when lock-pin 7 moves in the direction apart from lock hole 4 and disengages with lock hole 4, the rotation of eccentric bearing 1 becomes free.

When the rotation of eccentric bearing 1 is locked, the compression ratio is fixed. Since lock hole 4 is provided at such a position that lock hole 4 receives lock-pin 7 where the thickest wall portion of eccentric bearing 1 comes to the lowest position with respect to the axis of eccentric bearing 1, the fixed compression ratio is high. When the rotation of eccentric bearing 1 is unlocked, eccentric bearing 1 rotates around its axis receiving the moment which is produced by the loads on the piston and the arm of eccentricity of eccentric bearing 1. The loads on the piston include the combustion pressure, the compression force of the gas and the inertia force of the piston. When the piston is at T.D.C. of the compression stroke, eccentric bearing 1 rotates and naturally takes the rotational position in which the thickest wall portion of eccentric bearing 1 comes to the highest position with respect to the axis of eccentric bearing 1 and the compression ratio becomes low. In this way the compression ratio is changed by locking and unlocking the rotation of eccentric bearing 1 by means of lock-pin 7.

To make the engaging of lock-pin 7 with lock hole 4 smooth, guide groove 8 is formed in the radially outer portion of eccentric bearing 1. Guide groove 8 extends circumferentially and the center of guide groove 8 is in the plane which includes the center of lock hole 4. Guide groove 8 begins at an outside surface of eccentric bearing 1 apart from lock hole 4 and becomes gradually deep toward lock hole 4 where guide groove 8 terminates. The portion of the surface of lock hole 4 opposing guide groove 8 constitutes colliding surface 9 which collides with lock-pin 7 and stops the rotation of eccentric bearing 1, thereby allowing lock-pin 7 to enter lock hole 4 smoothly.

However, the smooth entry of lock-pin 7 into lock hole 4 can be obtained only when eccentric bearing 1 rotates in the normal direction of arrow N shown in FIGS. 26 to 28, because lock-pin 7 collides with colliding surface 9. When eccentric bearing 1 rotates in the reverse direction of arrow R, shown in FIGS. 29 to 31, lock-pin 7 can not collide with colliding surface 9 and may jump lock hole 4. If such jumping occurs, eccentric bearing 1 can not be locked by lock-pin 7 and, as a result, high compression ratio states can not be produced.

SUMMARY OF THE INVENTION

An object of the present invention is to provide a device for ensuring the reliable locking/unlocking rotation of an eccentric bearing used in a compression ratio changing mechanism of an internal combustion engine. The reliable engagement of a lock pin with a lock hole formed in an eccentric bearing is obtained whether the eccentric bearing rotates in a normal direction or in a reverse direction.

The object is achieved, according to the present invention, by providing a device, for locking/unlocking rotation of an eccentric bearing, having a cylindrical outside surface and a cylindrical inside surface eccentric with respect to the outside surface interposed between a piston-pin and an inside surface of a small end hole formed in a connecting rod for changing a compression ratio of an internal combustion engine. The device includes (a) a first lock-hole and a second lock hole formed in the eccentric bearing, the first and second lock holes extending in a radial direction of the eccentric bearing and being spaced from each other, (b) at least one lock-pin hole formed in the connecting rod, the lock-pin hole extending in an extension of a radius of the eccentric bearing and opening in the small end hole of the connecting rod on a corresponding locus of rotation of the first and the second lock holes, (c) a lock-pin slidably inserted in the lock-pin hole, (d) a first guide groove and a second guide groove formed in a radially outer portion of the eccentric bearing, the first guide groove beginning at an outside surface of the eccentric bearing, extending in a circumferential direction of the eccentric bearing, becoming gradually deep toward the first lock hole and terminating at the first lock hole and the second guide groove beginning at an outside surface of the eccentric bearing, extending in the other circumferential direction of the eccentric bearing opposite to the extending direction of the first guide groove, becoming gradually deep toward the second lock hole and terminating at the second lock hole, (e) a first colliding surface and a second colliding surface provided at positions opposite to the first guide groove and the second guide groove respectively, and (f) means for driving the lock-pin inserted in the lock-pin hole toward the lock hole or apart from the lock hole, one portion of the means being formed in the connecting rod.

In the device thus constructed, the lock-pin can collide with either one of the first and the second colliding surfaces whether the eccentric bearing rotates in a normal direction or in a reverse direction and can move into the lock hole formed in the eccentric bearing reliably without jumping the lock holes. As a result, a reliable engagement of the lock-pin with the lock hole can be obtained and reliable changing of the compression ratio can be obtained.

BRIEF DESCRIPTION OF THE DRAWINGS

These and other objects and advantages of the present invention will become apparent from the following detailed description of the presently preferred exemplary embodiments of the invention taken in conjunction with the accompanying drawings, wherein:

FIG. 22 is a sectional view of a compression ratio changing device including means for driving a lock-pin;

FIG. 23 is a transverse sectional view of the device of FIG. 22;

DETAILED DESCRIPTION OF THE PREFERRED EMBODIMENTS OF THE PRESENT INVENTION

Figure 1:
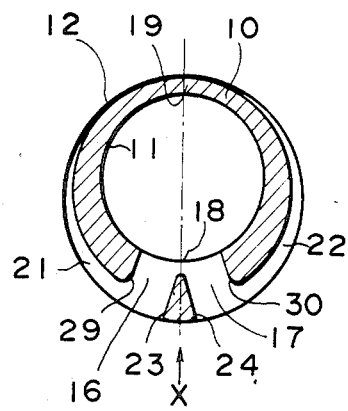
FIG. 1 is a sectional view of an eccentric bearing of a device in acordance with a first embodiment of the present invention.
Figure 2:
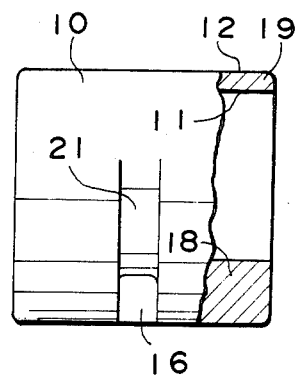
FIG. 2 is an elevational view of the eccentric bearing of FIG. 1 with one portion of the eccentric bearing shown in section.
Figure 3:
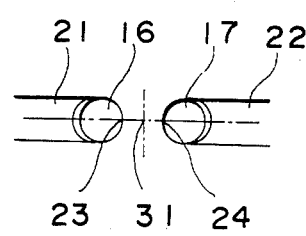
FIG. 3 is an elevational view of the vicinity of lock holes formed in the eccentric bearing of FIG. 1 viewed in a direction of arrow X in FIG. 1.

FIGS. 1-10 show an eccentric bearing and the vicinity thereof according to a first embodiment of the present invention. An eccentric bearing 10 comprises a cylindrical body which has a cylindrical outside surface 12 and a cylindrical inside surface 11 eccentric with respect to outside surface 12. Inside surface 11 rotatably contacts an outside surface of a piston-pin 13 (see FIGS. 22 and 23) and outside surface 12 rotatably contacts a surface of a small end hole 15 (see FIG. 22) formed in a connecting rod 14. In this way, eccentric bearing 10 is rotatably interposed between piston-pin 13 and connecting rod 14.

A first lock hole 16 and a second lock hole 17 are formed in eccentric bearing 10. First lock hole 16 and second lock hole 17 radially extend with respect to a center of outside surface 12 of eccentric bearing 10 and penetrate a wall of eccentric bearing 10. First lock hole 16 and second lock hole 17 are formed in the vicinity of a thickest wall portion 18 of eccentric bearing 10.

A first guide groove 21 and a second guide groove 22 are formed in a radially outer portion of eccentric bearing 10 and open to outside surface 12 of eccentric bearing 10. First guide groove 21 begins between a thickest wall portion 18 and a thinnest wall portion 19 of eccentric bearing 10 and extends toward first lock hole 16. First guide groove 21 terminates at first lock hole 16. Second guide groove 22 begins between thickest wall portion 18 and thinnest wall portion 19 of eccentric bearing 10 and extends in a circumferential direction reverse to the extending direction of first guide groove 21. Second guide groove 22 terminates at second lock hole 17.

A first colliding surface 23 is provided opposed to first guide groove 21 and a second colliding surface 24 is provided opposed to second guide groove 22. First colliding surface 23 is formed by a portion of a surface of first lock hole 16 which portion is opposed to first guide groove 21, and surface 23 is positioned radially outside of a deepest portion of a bottom of first guide groove 21. Similarly, second colliding surface 24 is formed by a portion of a surface of second lock hole 17 which portion is opposed to second guide groove 22, and surface 24 is positioned radially outside of a deepest portion of a bottom of second guide groove 22.

A lock-pin hole 25 is formed in connecting rod 14 and opens to the surface of small end hole 15. Lock-pin hole 25 is provided on a locus of rotation of first lock hole 16 and second lock hole 17 and extends in an extension of a radius of outside surface 12 of eccentric bearing 10.

A lock-pin 26 is slidably inserted in lock-pin hole 25. Lock-pin 26 can move into first lock hole 16 and second lock hole 17 of eccentric bearing 10 when hole 16 or 17 comes to lock-pin hole 25 due to the rotation of eccentric bearing 10. When lock-pin 26 is driven toward lock hole 16 or 17 and a portion of lock-pin 26 is brought into engagement with lock hole 16 or 17, the rotation of eccentric bearing is locked. On the contrary, when lock-pin 26 is driven toward apart from lock hole 16 or 17 and the engagement of lock-pin 26 with lock hole 16 or 17 is unlocked, the rotation of the eccentric bearing becomes free. A lock-pin driving means is formed in connecting rod 14. The lock pin driving means comprises a locking oil path 27 and an unlocking oil path 28 which extend from a small end portion to a large end portion of connecting rod 14. Locking oil path 27 is connected to a bottom portion of lock-pin hole 25. When locking oil path 27 is pressurized, lock-pin 26 is driven toward eccentric bearing 10. Unlocking oil path 28 is opened to the surface of small end hole 15 of connecting rod 14 and can be fluidly connected to lock hole 16 or 17 via first guide groove 21 or second guide groove 22. When unlocking oil path 28 is pressurized, lock-pin 26 is driven to move apart from eccentric bearing 10.

An axis of first lock hole 16, an axis of second lock hole 17, a center of first guide groove 21, a center of second guide groove 22, a center of first colliding surface 23 and a center of second colliding surface 24 are included in a common plane which is at a right angle with respect to a longitudinal axis of eccentric bearing 10.

First guide groove 21 and second guide groove 22 are arranged in symmetry to each other with respect to a radially extending line which passes thickest wall portion 18 and thinnest wall portion 19 of eccentric bearing 10. First lock hole 16 and second lock hole 17 are arranged in symmetry to each other with respect to the line which passes thickest wall portion 18 and thinnest wall portion 19 of eccentric bearing 10 and have an identical diameter.

First guide groove 21 becomes gradually deep toward first lock hole 16 and second guide groove 22 becomes gradually deep toward second lock hole 17. A transition portion 29 from first guide groove 21 to first lock hole 16 is rounded and a transition portion 30 from second guide groove 22 to second lock hole 17 is also rounded. Such rounded portions 29 and 30 make sliding of lock-pin 26 into lock holes 16 and 17 smooth.

Figure 10:
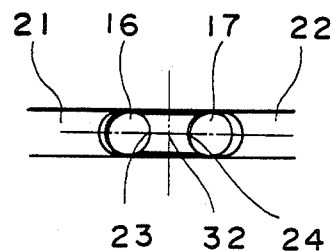
FIG. 10 is an elevational view of the vicinity of a participating piece fixed to the eccentric bearing.

In the embodiment of FIGS. 1 to 9, first colliding surface 23 and second colliding surface 24 are respectively formed by the surfaces of two holes bored in eccentric bearing 10, i.e., first lock hole 16 and second lock hole 17 which are independent of each other. In the embodiment of FIG. 10, a single circumferentially elongated hole is formed in eccentric bearing 10 and a partitioning piece 32 is fixed to eccentric bearing 10 so as to divide the elongated hole, at a mid-portion of the elongated hole, into two hole portions which constitute first lock hole 16 and second lock hole 17. In the embodiment of FIG. 10, first colliding surface 23 and second colliding surface 24 are formed by both side surfaces of partitioning piece 32 which surfaces are opposed to first guide groove 21 and second guide groove 22 respectively. In this instance such colliding surfaces 23 and 24 are easily formed by fixing partioning piece 32 to eccentric bearing 10 by welding, etc.

Figure 11:
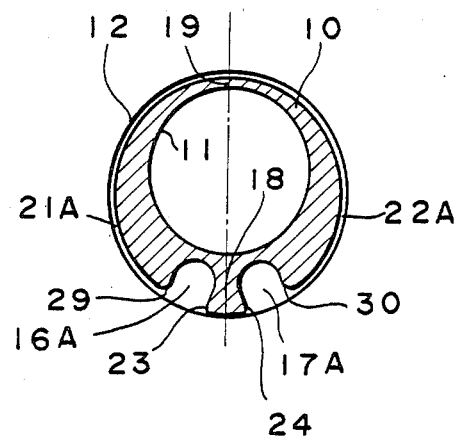
FIG. 11 is a sectional view of another eccentric bearing having a first guide groove and a second guide groove in accordance with the first embodiment of the present invention in which the first guide groove and the second guide groove are formed in a common groove having a constant depth.

First guide groove 21 and second guide groove 22 may be formed in a single common groove as shown by a first guide groove 21A and a second guide groove 22A of FIG. 11. Guide grooves 21 and 22 or 21A and 22A may have a constant depth. Further, first lock hole 16 and second lock hole 17 may be constructed of holes which extend from outside surface 12 of eccentric bearing 10 to a mid portion between outside surface 12 and inside surface 11 of eccentric bearing 10 as shown by a first lock hole 16A and a second lock hole 17A of FIG. 11.

Figure 12:
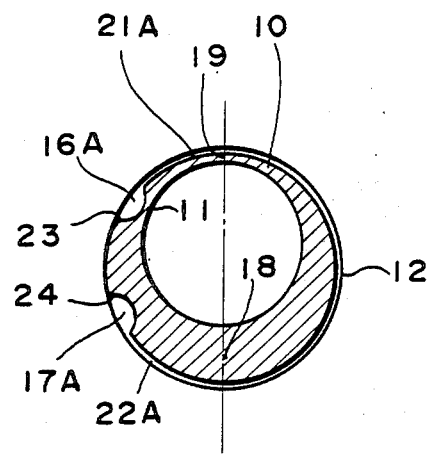
FIG. 12 is a sectional view of another eccentric bearing in accordance with the first embodiment of the present invention in which a first lock hole and a second lock hole are formed in the portion of the eccentric bearing other than the thickest wall portion thereof.
Figure 13:
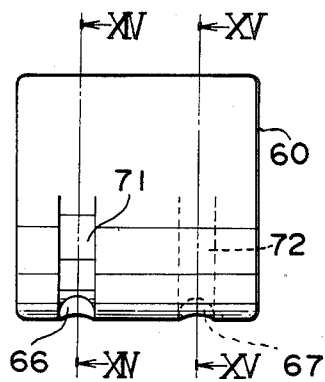
FIG. 13 is an elevational view of an eccentric bearing in accordance with a second embodiment of the present invention.
Figure 14:
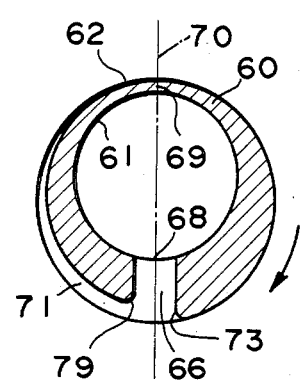
FIG. 14 is a sectional view taken along line XIV—XIV in FIG. 13.
Figure 15:
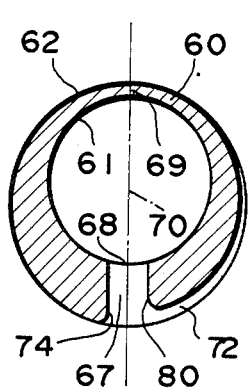
FIG. 15 is a sectional view taken along line XV—XV in FIG. 13.

First lock hole 16 or 16A and second lock hole 17 or 17A may be formed in the portion of eccentric bearing 10 which portion is apart from the thickest wall portion of eccentric bearing 10 as shown in FIG. 12. In such a case, when the rotation of eccentric bearing 10 is locked, the thickest wall portion of eccentric bearing 10 should come to the lowest position with respect to the center of eccentric bearing 10. These embodiments are included in the first embodiment of the present invention, because a center of first lock hole 16A and a center of second lock hole 17A are included in a single common plane.

Figure 24:
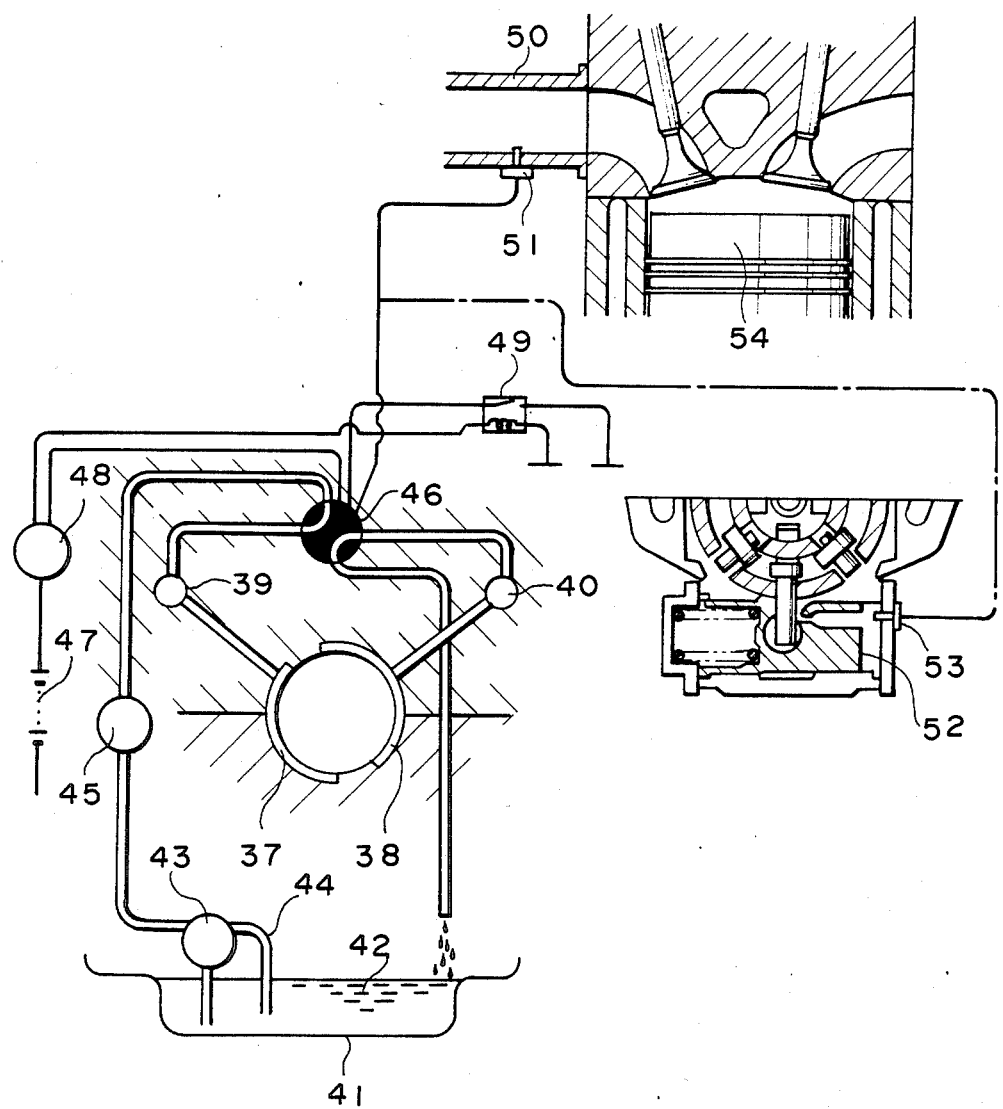
FIG. 24 is a diagram of an oil circuit connected to the device of FIG. 22 for driving the lock-pin.

A circuit for driving lock-pin 26 is shown in FIGS. 22 to 24.

Locking oil path 27 and unlocking oil path 28 are fluidly connected to oil grooves 33 and 34 which are formed independent of each other on a bearing portion of the large end portion of connecting rod 14. Oil grooves 33 and 34 are fluidly connected to oil grooves 37 and 38, independent of each other, formed in a bearing portion for supporting a crank shaft 35 via an single oil hole 36 formed in a crank shaft 35. Oil grooves 33 and 34 are intermittently connected to grooves 37 and 38 respectively according to rotation of crank shaft 35. In detail, oil groove 37 can intermittently be connected to locking oil path 27 via oil hole 36 and oil groove 33, and oil groove 38 can intermittently be connected to unlocking oil path 28 via oil hole 36 and oil groove 34.

An oil path 39 for a high compression ratio and an oil path 40 for a low compression ratio are formed in a cylinder block. Oil path 39 for the high compression ratio is fluidly connected to oil groove 37 and oil path 40 for the low compression ratio is fluidly connected to oil groove 38. Oil 42 in an oil pan 41 is pumped up to a main oil hole formed in the cylinder block by an oil pump 45 via an oil strainer 43 and a return pipe 44 for releasing overly pressurized oil to oil pan 41. Oil 42 in the main oil hole is selectively sent via switching valve 46 to either oil path 39 for the high compression ratio or oil path 40 for the low compression ratio. A battery 47, an ignition switch 48, a relay 49 for sensing a start signal of the engine, a pressure switch 51 acting by a negative pressure of an intake manifold in the case of a gasoline engine, and a pressure switch 53 provided in a pumping chamber 52 of a fuel injection pump in the case of a diesel engine are connected as shown in FIG. 24. These elements are operated to switch switching valve 46 according to engine operating conditions such that pressurized oil is selectively sent to oil path 40 for the low compression ratio under high engine loads and sent to oil path 39 for the high compression ratio under low engine loads.

Next, the operation of the first embodiment thus constituted will be explained.

Figure 25:
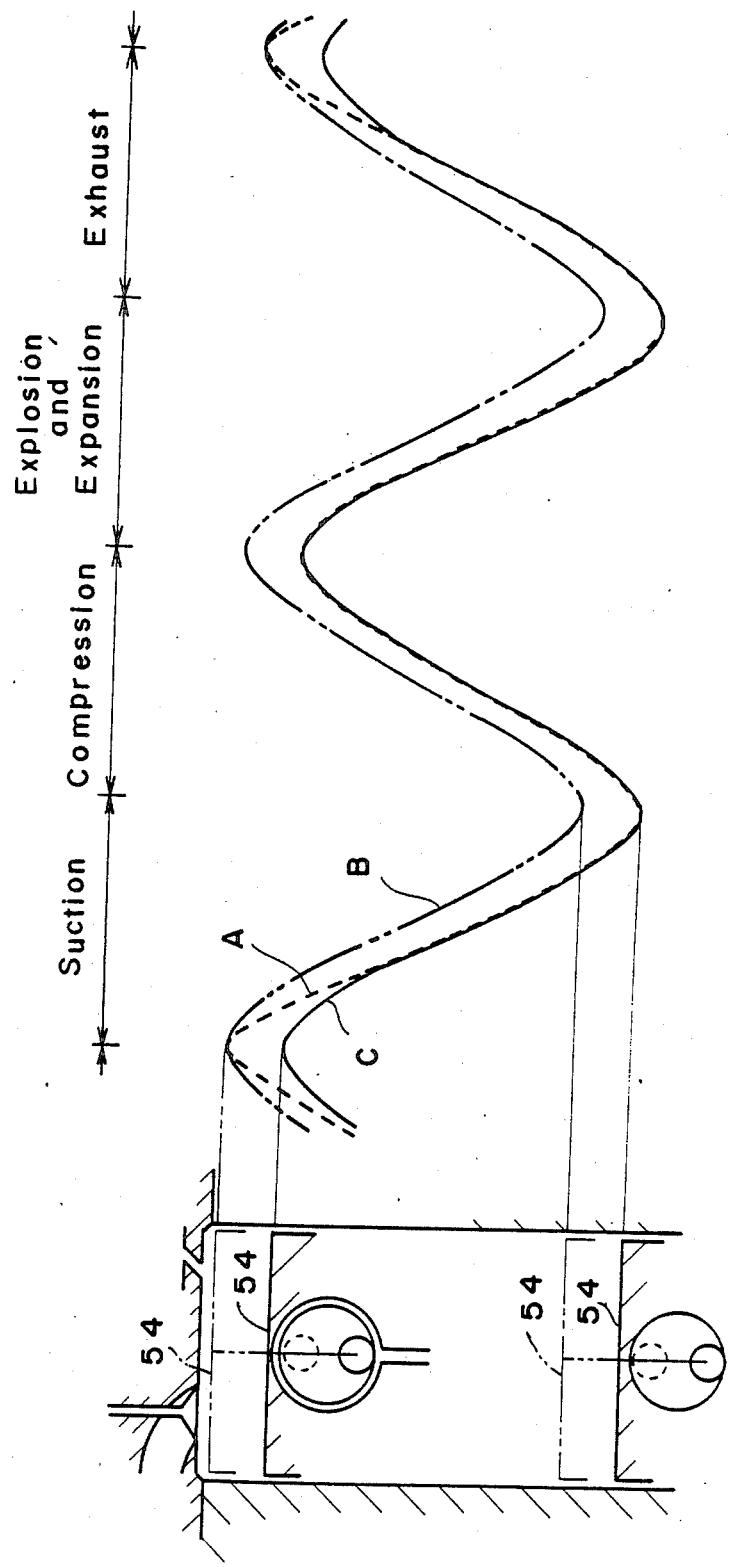
FIG. 25 is a diagram showing a relationship between movement of a piston and time.
Figure 26:
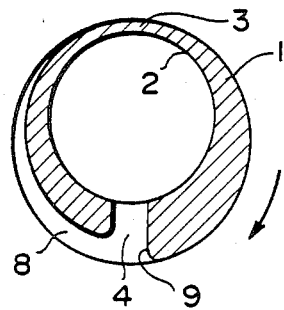
FIG. 26 is a sectional view of the eccentric bearing disclosed in Japanese Utility Model Publication SHO No. 58-137832.
Figure 27:
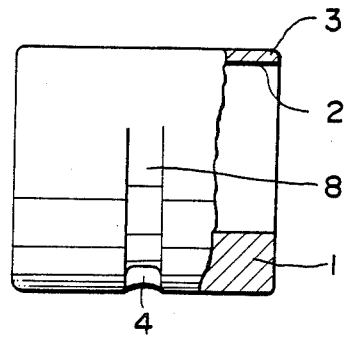
FIG. 27 is is an elevational view of the eccentric bearing of FIG. 26.
Figure 28:
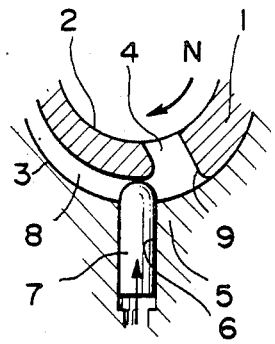
FIG. 28 is a sectional view of the vicinity of the lock hole formed in the eccentric bearing of FIG. 26 in which the eccentric bearing is rotating in a normal direction.
Figure 29:
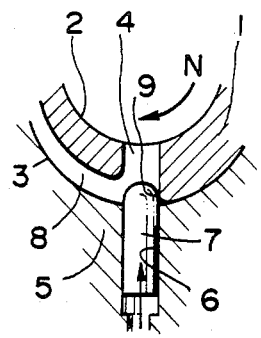
FIG. 29 is a sectional view of the vicinity of the lock hole formed in the eccentric bearing of FIG. 26 in which the rotation of the eccentric bearing in the normal direction is more advanced than in FIG. 28.
Figure 30:
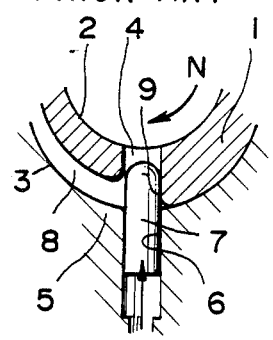
FIG. 30 is a sectional view of the vicinity of the eccentric bearing of FIG. 26 in which a lock-pin is engaged with the lock hole.
Figure 31:
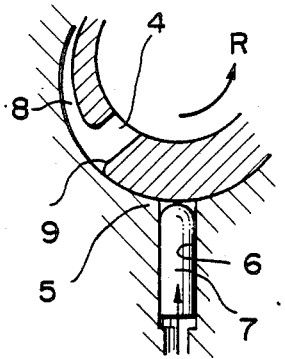
FIG. 31 is a sectional view of the vicinity of the lock hole formed in the eccentric bearing of FIG. 26 in which the eccentric bearing is rotating in a reverse direction.
Figure 32:
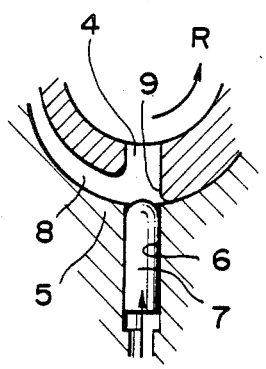
FIG. 32 is a sectional view of the vicinity of the lock hole formed in the eccentric bearing of FIG. 26 in which the rotation of the eccentric bearing in the reverse direction is more advanced than in FIG. 31.
Figure 33:
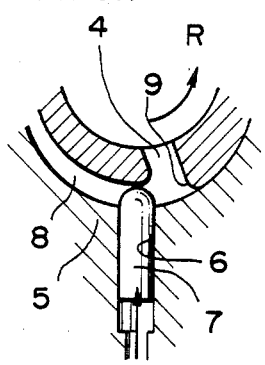
FIG. 33 is a sectional view of the vicinity of the lock hole formed in the eccentric bearing in which the rotation of the eccentric bearing in the reverse direction is more advanced than in FIG. 32 and the lock pin has jumped the lock hole.

When the engine is under high loads and a low compression ratio should be obtained, the pressurized oil is selectively sent to oil path 40 for the low compression ratio by switching valve 46 and further sent via oil groove 38, oil hole 36 in crank shaft 35 and oil groove 34 to unlocking oil path 28. The pressurized oil in unlocking oil path 28 drives lock-pin 26 apart from eccentric bearing 10 and allows the entire portion of lock-pin 26 to be housed in lock-pin hole 25. When the engagement of lock-pin 26 with lock hole 16 in eccentric bearing 10 is relieved, the rotation of eccentric bearing 10 is unlocked. Since the rotation of eccentric bearing 10 is free in the unlocked state, eccentric bearing 10 rotates around its axis when it receives the loads from a piston 54, that is, a pressurized gas pressure, a combustion pressure and an inertia force of piston 54. Thus, piston 54 moves according to a line A of FIG. 25. As a result, piston 54 naturally takes the lowest position with respect to connecting rod 14 and the state of low compression ratio is obtained. Therefore, knocking is prevented and improvements in fuel efficiency and axial torque can be obtained.

On the contrary, when the engine is under low loads and a high compression ratio should be obtained, the pressurized oil is selectively sent to oil path 39 for the high compression ratio by switching valve 46 and further sent via oil groove 37, oil hole 36 in crank shaft 35 and oil groove 33 to locking oil path 27. The pressurized oil in locking oil path 27 drives lock-pin 26 toward eccentric bearing 10 and allows lock-pin 26 to engage with first lock hole 16 in eccentric bearing 10 rotating in the normal direction of arrow A, thereby the rotation of eccentric bearing 10 is locked. When eccentric bearing 10 rotates in the reverse direction of arrow R, lock-pin 26 engages second lock hole 17. Since the relative position of piston 54 with respect to connecting rod 14 is locked at a high position by locking eccentric bearing 10, a high compression ratio can be produced. In the locking state, piston 54 moves according to a line B of FIG. 23. A line C of FIG. 24 shows a movement of piston 54 which would be obtained if the rotation of eccentric bearing 10 was locked under a low compression ratio state. As a result, a high compression ratio can be obtained under low engine loads and improvements in fuel efficiency and axial torque can be obtained.

In the above locking of the rotation of eccentric bearing 10, it should be noted that eccentric bearing 10 does not always rotate in the normal direction of arrow N, that is, eccentric bearing 10 may rotate in the reverse direction of arrow R.

Figure 4:
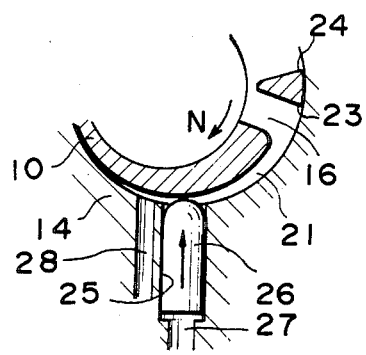
FIG. 4 is a sectional view of the vicinity of the lock holes formed in the eccentric bearing of FIG. 1 in which the eccentric bearing is rotating in a normal direction of arrow N.
Figure 5:
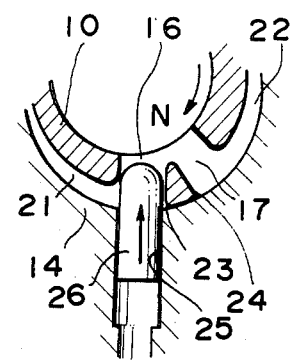
FIG. 5 is a sectional view of the vicinity of the lock holes formed in the eccentric bearing of FIG. 1 in which the rotation of the eccentric bearing in the normal direction is more advanced than in FIG. 4.
Figure 6:
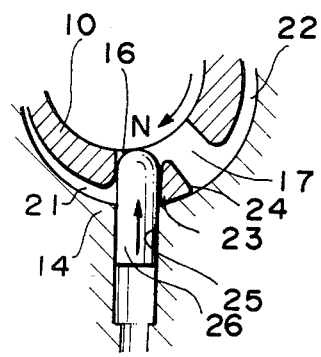
FIG. 6 is a sectional view of the vicinity of the lock holes formed in the eccentric bearing of FIG. 1 in which a lock-pin is engaged with a first lock hole.
Figure 7:
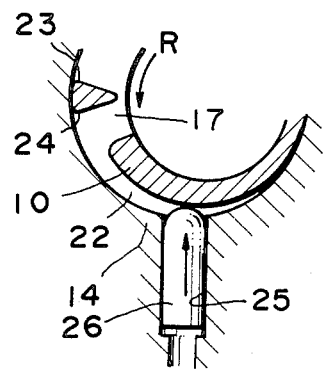
FIG. 7 is a sectional view of the vicinity of the lock holes formed in the eccentric bearing of FIG. 1 in which the eccentric bearing is rotating in a reverse direction of arrow R.
Figure 8:
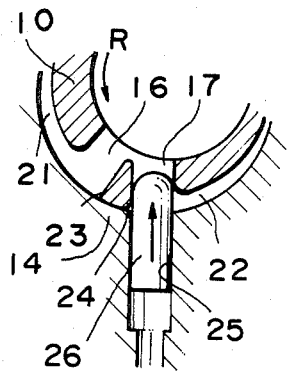
FIG. 8 is a sectional view of the vicinity of the lock holes formed in the eccentric bearing of FIG. 1 in which the rotation of the eccentric bearing in the reverse direction is more advanced than in FIG. 7.
Figure 9:
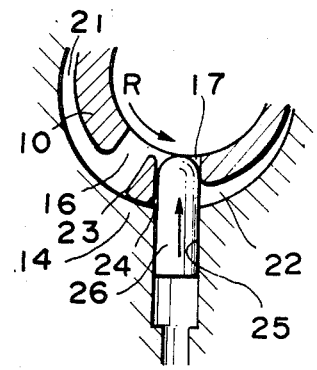
FIG. 9 is a sectional view of the vicinity of the lock holes formed in the eccentric bearing of FIG. 1 in which a lock-pin is engaged with a second lock hole.

When eccentric bearing rotates in the normal direction of arrow N, as shown in FIGS. 4 to 6, first guide groove 21 slides with respect to lock-pin 26 and then first colliding surface 23 collides with lock-pin 26 whereby the rotation of eccentric bearing 10 is stopped. As a result, lock-pin 26 can reliably be driven into first lock hole 16.

When eccentric bearing rotates in the reverse direction of arrow R, second guide groove 22 slides with respect to lock-pin 26 and then second colliding surface 24 collides with lock-pin 26, whereby the rotation of eccentric bearing 10 is stopped. As a result, lock-pin 26 can be reliably driven into second lock hole 17.

In this way lock-pin 26 can engage with either first lock hole 16 or second lock hole 17 without jumping lock holes 16 and 17 whether eccentric bearing 10 rotates in the normal direction of arrow N or in the reverse direction of arrow R and the high compression ratio can reliably be obtained.

FIGS. 13 to 21 shows a second embodiment of the present invention.

The second embodiment differs from the first embodiment in that two lock holes are formed apart from each other in the axial direction of an eccentric bearing and therefore two lock-pin holes and two lock-pins are provided in the second embodiment.

In FIGS. 13 to 21, an eccentric bearing 60 has a cylindrical outside surface 62 and a cylindrical inside surface eccentric with respect to outside surface 61. Inside surface 61 rotatably contacts an outside surface of a piston-pin 63 and outside surface 62 rotatably contacts a surface of a small end hole 65 formed in a connecting rod 64. In this way, eccentric bearing 60 is rotatably interposed between piston-pin 63 and connecting rod 64.

A first lock hole 66 and a second lock hole 67 are formed in eccentric bearing 60. First lock hole 66 and second lock hole 67 radially extend with respect to a center of outside surface 62 of eccentric bearing 60 and penetrate a wall of eccentric bearing 60. First lock hole 66 and second lock hole 67 are provided apart from each other in an axial direction of eccentric bearing 60 and are included in a common plane which includes a longitudinal axis of eccentric bearing 60. First lock hole 66 and second lock hole 67 are formed in the vicinity of a thickest wall portion 68 of eccentric bearing 60.

A first guide groove 71 and a second guide groove 72 are formed in a radially outer portion of eccentric bearing 60 and open to outside surface 62 of eccentric bearing 60. First guide groove 71 begins between thickest wall portion 68 and a thinnest wall portion 69 of eccentric bearing 60 and extends toward first lock hole 66. First guide groove 71 terminates at first lock hole 66. Second guide groove 72 begins between thickest wall portion 68 and thinnest wall portion 69 of eccentric bearing 60 and extends reverse to the extending direction of first guide groove 71. Second guide groove 72 terminates at second lock hole 67.

A first colliding surface 73 is provided opposed to first guide groove 71 and a second colliding surface 74 is provided opposed to second guide groove 72. First colliding surface 73 is formed by a portion of a surface of first lock hole 66 which portion is opposed to first guide groove 71 and surface 73 is positioned radially outside of a a deepest portion of a bottom of first guide groove 71. Similarly, second colliding surface 74 is formed by a portion of a surface of second lock hole 67 which portion is opposed to second guide groove 72 and surface 74 is positioned radially outside of a deepest portion of a bottom of second guide groove 72.

Lock-pin holes 75A and 75B are formed in connecting rod 64 and open to the surface of the small end hole of connecting rod 64. Lock-pin holes 75A and 75B are provided on locuses of rotation of first lock hole 66 and second lock hole 67 respectively and extend in extensions of radius of outside surface 62 of eccentric bearing 60.

Lock-pins 76A and 76B are slidably inserted in lock-pin holes 75A and 75B respectively. Lock-pins 76A and 76B can move into first lock hole 66 and second lock hole 67 in eccentric bearing 60, respectively, when lock holes 16 and 17 come to lock-pin holes 75A and 75B, respectively, due to the rotation of eccentric bearing 60. When lock-pins 76A and 76B are driven toward lock holes 66 or 67 and a portion of lock-pin 76A or 76B is brought into engagement with lock hole 66 or 67, the rotation of eccentric bearing 60 is locked. On the contrary, when lock-pins 76A and 76B are driven apart from lock holes 66 and 67 and the engagement of lock-pin 76A and 76B with lock holes 76 and 77 is unlocked, the rotation of ecccentric bearing 60 becomes free. A lock-pin driving means is formed in connecting rod 14. The lock pin driving means comprises a locking oil path 77 and an unlocking oil path 78 which extend from a small end portion to a large end portion of connecting rod 64. Locking oil path 77 is connected to bottom portions of lock-pin hole 75A and 75B. When locking oil path 77 is pressurized, lock-pins 76A and 76B are driven toward eccentric bearing 60. Unlocking oil path 78 is opened to the surface of the small end hole of connecting rod 64 and can be fluidly connected to lock hole 66 or 67 via first guide groove 71 or second guide groove 72. When unlocking oil path 78 is pressurized, lock-pins 76A and 76B are driven to move apart from eccentric bearing 60.

An axis of first lock hole 66, a center of first guide groove 71 and a center of first colliding surface 73 are included in a common first plane which is at a right angle with respect to an axis of eccentric bearing 60. Also, an axis of second lock hole 67, a center of second guide groove 72 and a center of second guide groove 74 are included in a common second plane which is at a right angle with respect to the axis of eccentric bearing 60 and apart from the first plane in the axial direction of eccentric bearing 60.

First guide groove 71 and second guide groove 72 are arranged in symmetry to each other with respect to a radially extending line which passes thickest wall portion 68 and thinnest wall portion 69 of eccentric bearing 60, though the two grooves 71 and 72 are staggered in the axial direction of eccentric bearing 60. First lock hole 66 and second lock hole 67 are arranged in symmetry to each other with respect to the line which passes thickest wall portion 68 and thinnest wall portion 69 of eccentric bearing 60 and have an identical diameter, though lock holes 66 and 67 are staggered in the axial direction of eccentric bearing 60.

First guide groove 71 becomes gradually deep toward first lock hole 66 and second guide groove 72 becomes gradually deep toward second lock hole 67. A transition portion 79 from first guide groove 71 to first lock hole 66 is rounded and a transition portion 80 from second guide groove 72 to second lock hole 67 is also rounded. Such rounded portions 79 and 80 make sliding of lock-pin 76A and 76B into lock holes 66 and 67 smooth.

In the embodiment of FIGS. 13 to 21, first colliding surface 73 and second colliding surface 74 are respectively formed by the surfaces of two holes bored in eccentric bearing 60, i.e., first lock hole 66 and second lock hole 67 which are independent of each other. However, similarly to the structure shown in FIG. 10 of the first embodiment of the present invention, in the second embodiment a single axially elongated hole may be formed in eccentric bearing 60 and a partitioning piece (not shown) may be fixed to eccentric bearing 60 so as to divide the elongated hole at a mid-portion of the elongated hole into two hole portions which constitute first lock hole 66 and second lock hole 67 respectively. In such a structure first colliding surface 73 and second colliding surface 74 are formed by the portions of the surface of the elongated hole which portions are opposed to first guide groove 71 and second guide groove 72 respectively. In this instance such colliding surfaces 73 and 74 are easily formed by the elongated hole. The fixing of such a partitioning piece to eccentric bearing 60 can easily be performed through welding, etc.

Lock holes 66 and 67 may be constructed such that they do not penetrate the wall of eccentric bearing 60 as shown by lock holes 16A and 17A in FIG. 11 and such that they are formed at the non-thickest wall portion of eccentric bearing 60 as shown by the positions of lock holes 16A and 17A in FIG. 12. Such cases are included in the second embodiment of the present invention, because lock holes 66 and 67 are staggered in the axial direction of eccentric bearing 60.

A circuit for driving lock-pins 76A and 76B is of the same structure as that shown in FIGS. 22 to 24, described above, and therefore a detailed explanations will be omitted.

Next operation of the second embodiment thus constructed will be explained, though the operation of the second embodiment is very similar to that of the first embodiment.

When the engine is under high loads and a low compression ratio should be obtained, the pressurized oil is selectively sent to oil path 40 for the low compression ratio by switching valve 46 and further sent via oil groove 38, oil hole 36 in crank shaft 35 and oil groove 34 to unlocking oil path 78. The pressurized oil in unlocking oil path 78 drives lock-pins 76A and 76B toward apart from eccentric bearing 60 to allow the entire portion of lock-pins 76A and 76B to be housed in lock-pin holes 75A and 75B, respectively. When the engagement of lock-pins 76A and 76B with lock holes 76A and 76B formed in eccentric bearing 60 is relieved, the rotation of eccentric bearing 60 is unlocked. Since the rotation of eccentric bearing 60 is free in the unlocked state, eccentric bearing 60 rotates around its axis when it receives the loads from a piston 54, that is, a pressurized gas pressure, a combustion pressure and an inertia force of piston 54. Thus, piston 54 moves according to line A of FIG. 23. As a result, piston 54 naturally takes the lowest position with respect to connecting rod 64 and the state of low compression ratio can be obtained. Therefore, knocking is prevented and improvements in fuel efficiency and axial torque can be obtained.

On the contrary, when the engine is under low loads and a high compression ratio should be obtained, the pressurized oil is selectively sent to oil path 39 for high compression ratio by switching valve 46 and further sent via oil groove 37, oil hole 36 in crank shaft 35 and oil groove 33 to locking oil path 77. The pressurized oil in locking oil path 77 drives lock-pin 76A and 76B toward eccentric bearing 60 and allows lock-pin 76A to engage with first lock hole 66 in eccentric bearing 60 rotating in the normal direction of arrow N, thereby the rotation of eccentric bearing 60 is locked. When eccentric bearing 60 rotates in the reverse direction of arrow R, lock-pin 76B engages with second lock hole 67. Since the relative position of piston 54 with respect to connecting rod 64 is locked at a high position under locking of eccentric bearing 16, a high compression ratio can be produced. In the locking state, piston 54 moves according to a line B of FIG. 23. As a result, a high compression ratio can be obtained under low engine loads and improvements in fuel efficiency and axial torque can be obtained.

In the above locking of the rotation of eccentric bearing 60, it should be noted that eccentric bearing 60 does not always rotate in the normal direction of arrow N, that is, eccentric bearing 60 may rotate in the reverse direction of arrow R.

Figure 16:
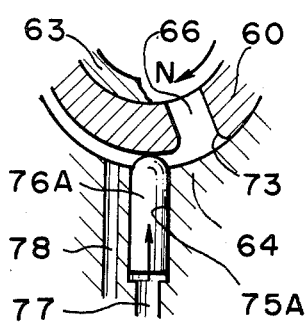
FIG. 16 is a sectional view of the vicinity of lock holes formed in the eccentric bearing of FIG. 13 in which the eccentric bearing is rotating in a normal direction.
Figure 17:
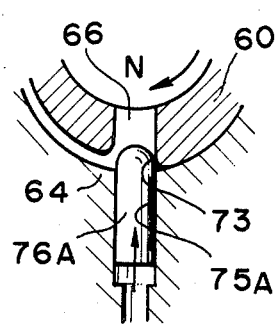
FIG. 17 is a sectional view of the vicinity of the lock holes formed in the eccentric bearing of FIG. 13 in which the rotation of the eccentric bearing in the normal direction is more advanced than in FIG. 16.
Figure 18:
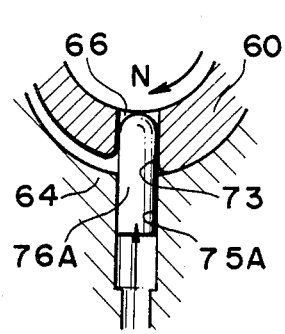
FIG. 18 is a sectional view of the vicinity of the lock holes formed in the eccentric bearing of FIG. 13 in which a lock-pin is engaged with a first lock hole.
Figure 19:
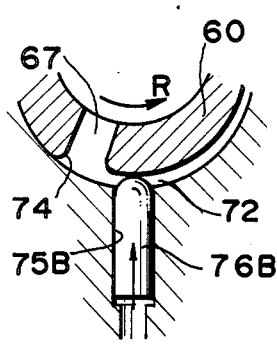
FIG. 19 is a sectional view of the vicinity of the lock holes formed in the eccentric bearing of FIG. 13 in which the eccentric bearing is rotating in a reverse direction.
Figure 20:
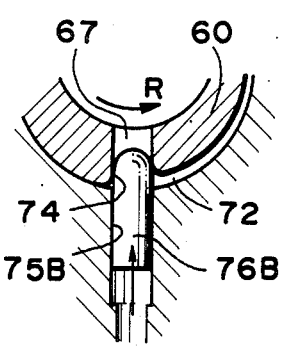
FIG. 20 is a sectional view of the vicinity of the lock holes formed in the eccentric bearing of FIG. 13 in which the rotation of the eccentric bearing in the reverse direction is more advanced than in FIG. 19.
Figure 21:
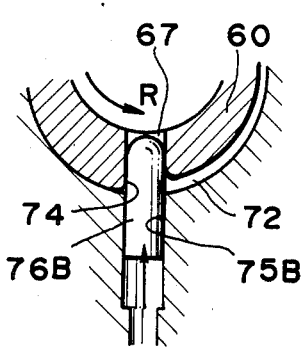
FIG. 21 is a sectional view of the vicinity of the lock holes formed in the eccentric bearing of FIG. 13 in which a lock-pin is engaged with a second lock hole.

When eccentric bearing 60 rotates in the normal direction of arrow N, as shown in FIGS. 16 to 18, first guide groove 71 slides with respect to first lock-pin 76A and then first colliding surface 73 collides with first lock-pin 76A whereby the rotation of eccentric bearing 60 is stopped. As a result, lock-pin 76A can reliably be driven into first lock hole 66.

When eccentric bearing 60 rotates in the reverse direction of arrow R, second guide groove 72 slides with respect to second lock-pin 76A and then second colliding surface 74 collides with second lock-pin 76B whereby the rotation of eccentric bearing 60 is stopped. As a result, second lock-pin 76B can be reliably driven into second lock hole 67.

In this way either first lock-pin 76A or second lock-pin 76B can engage first lock hole 66 or second lock hole 67 without jumping lock hole 66 or 67 whether eccentric bearing 60 rotates in the normal direction of arrow N or in the reverse direction of arrow R and the switching to a high compression ratio can reliably be performed.

Therefore, according to the first and second embodiments of the present invention, the effect that switching to the high compression ratio can reliably be performed is obtained.

Although only preferred embodiments of the present invention have been described in detail, it will be appreciated by those skilled in the art that various modifications can be made to the particular embodiments shown without materially departing from the novel teachings and advantages of the present invention. Accordingly, it is to be understood that all such modifications and alterations are included within the scope of the present invention as defined by the following claims.

What is claimed is:

1. A device for locking/unlocking rotation of an eccentric bearing having a cylindrical outside surface and a cylindrical inside surface eccentric with respect to the outside surface interposed between an outside surface of a piston-pin and an inside surface of a small end hole of a connecting rod of an internal combustion engine, said locking/unlocking device comprising:
   a first lock hole and a second lock hole formed in said eccentric bearing, said first lock hole and said second lock hole extending in a radial direction of said eccentric bearing;
   a first guide groove and a second guide groove formed in a radially outer portion of said eccentric bearing, said first guide groove and said second guide groove extending in circumferential directions, opposite to each other, of said eccentric bearing from said first lock hole and said second lock hole, respectively;
   a first colliding surface and a second colliding surface formed in said eccentric bearing, said first colliding surface and said second colliding surface being opposed to said first guide groove and said second guide groove, respectively, and being positioned radially outside of a deepest portion of a bottom of said first guide groove and a deepest portion of a bottom of said second guide groove, respectively;
   at least one lock-pin hole formed in said connecting rod, said lock-pin hole extending along an extension of a radius of said eccentric bearing corresponding to a locus of rotation of said first lock hole and said second lock hole;
   at least one lock-pin slidably inserted in said at least one lock-pin hole; and
   means for driving said at least one lock-pin, said means being fluidly connected to said at least one lock-pin hole.

2. The device of claim 1, wherein centers of said first lock hole, said second lock hole, said first guide groove, said second guide groove, said first colliding surface, said second colliding surface, said at least one lock-pin hole and said at least one lock-pin are included in a single common plane which is at a right angle with respect to an axis of said eccentric bearing.

3. The device of claim 2, wherein said first guide groove and said second guide groove are formed in symmetry to each other with respect to a radially extending line which passes a thickest wall portion and a thinnest wall portion of said eccentric bearing and said first lock hole and said second lock hole are formed in symmetry to each other with respect to said radially extending line.

4. The device of claim 2, wherein said first guide groove and said second guide groove become gradually deep toward said first lock hole and said second lock hole, respectively.

5. The device of claim 2, wherein said first lock hole and said second lock hole are constructed of holes independent of each other and said first colliding surface and said second colliding surface are constructed of portions of the surfaces of said first lock hole and said second lock hole, respectively.

6. The device of claim 2, wherein a circumferentially elongated hole is formed in said eccentric bearing and the elongated hole is divided by a partitioning piece to two hole portions which constitute said first lock hole and said second lock hole, said first colliding surface and said second colliding surface being formed on both side surfaces of said partitioning piece.

7. The device of claim 2, wherein said first lock hole and said second lock hole are provided at a vicinity of the thickest portion of said eccentric bearing.

8. The device of claim 2, wherein said first guide groove and said second guide groove are formed by a single common groove having a constant depth.

9. The device of claim 2, wherein said first lock hole and said second lock hole are constructed of holes penetrating a wall of said eccentric bearing.

10. The device of claim 2, wherein said first lock hole and said second lock hole are constructed of holes extending from the outside surface of said eccentric bearing to a mid-portion between the inside surface and the outside surface of said eccentric bearing.

11. The device of claim 2, wherein said first lock hole and said second lock hole are formed non-symmetrically to each other with respect to a radially extending line which passes a thickest wall portion and a thinnest wall portion of said eccentric bearing.

12. The device of claim 1, wherein said first lock hole and said second lock hole are positioned apart from each other in an axial direction of said eccentric bearing, a first lock-pin hole and a second lock-pin hole being provided in correspondence with said first lock hole and said second lock hole, respectively, a first lock-pin and a second lock-pin being slidably inserted in said first lock-pin hole and said second lock-pin hole, respectively.

13. The device of claim 12, wherein centers of said first lock hole and said second lock hole are included in a single plane which includes a longitudinally extending axis of said eccentric bearing.

14. The device of claim 12, wherein centers of said first lock hole, said first guide groove, said first colliding surface, said first lock-pin hole and said first lock-pin are included in a single common first plane which is at a right angle with respect to an axis of said eccentric bearing and centers of said second lock hole, said second guide groove, said second colliding surface, said second lock-pin hole and said second lock-pin are included in a single common second plane which is at a right angle with respect to the axis of said eccentric bearing, said first plane and said second plane being apart from each other in the axial direction of said eccentric bearing.

15. The device of claim 12, wherein said first guide groove and said second guide groove are in symmetry to each other with respect to a radially extending line which passes a thickest portion and a thinnest portion of said eccentric bearing.

16. The device of claim 12, wherein said first guide groove and said second guide groove become gradually deep toward said first lock hole and said second lock hole, respectively.

17. The device of claim 12, wherein said first colliding surface and said second colliding surface are formed by portions of the surfaces of said first lock hole and said second lock hole, respectively.

18. The device of claim 12, wherein a single axially extending hole is formed in said eccentric bearing and said axially extending hole is divided by a partitioning piece into two holes which constitute said first lock hole and said second lock hole.

19. The device of claim 12, wherein said first lock hole and said second lock hole are constructed of holes which penetrate a wall of said eccentric bearing.

20. The device of claim 12, wherein said first lock hole and said second lock hole are constructed of holes which extend from the outside surface of said eccentric bearing to a mid-portion of said outside surface and said inside surface of said eccentric bearing.

21. The device of claim 12, wherein said first lock hole and said second lock hole are included in different planes, respectively, which planes include an axis of said eccentric bearing, are in symmetry to each other with respect to a radially extending line passing a thinnest wall portion and a thickest wall portion of said eccentric bearing, and are at a right angle with respect to the axis of said eccentric bearing.

22. The device of claim 12, wherein said first lock hole and said second lock hole are provided non-symmetrically to each other with respect to a radially extending line which is at a right angle with respect to an axis of said eccentric bearing and which passes a thinnest wall portion and a thickest wall portion of said eccentric bearing.

* * * * *